United States Patent [19]

Maeda et al.

[11] Patent Number: 5,870,283
[45] Date of Patent: Feb. 9, 1999

[54] PORTABLE COMPUTER DOCKING UNIT HAVING AN INHIBITOR FOR INHIBITING MOVEMENT OF A MECHANICAL LOCK TO A LOCK POSITION

[75] Inventors: Kazuhiko Maeda, Sagamihara; Masaki Kobayashi; Taketoshi Yokemura, both of Yamato; Takashi Yanagisawa, Yokohama, all of Japan

[73] Assignee: International Business Machines Corporation, Armonk, N.Y.

[21] Appl. No.: 828,453

[22] Filed: Mar. 28, 1997

[30] Foreign Application Priority Data

Mar. 28, 1996 [JP] Japan ..................................... 8-073669

[51] Int. Cl.$^6$ ..................................................... G06F 1/16
[52] U.S. Cl. ............................................... 361/686; 70/58
[58] Field of Search ..................... 364/708.1; 361/686; 70/58, 389, 158–173

[56] References Cited

U.S. PATENT DOCUMENTS 5,450,271  9/1995  Fukushima et al. ..................... 361/686
5,555,487  9/1996  Katoh et al. ........................... 70/159 X

OTHER PUBLICATIONS

Uncertified copy JA9–94–030 for Japanese Patent Application No. Hei 06–134124.
Uncertified copy JA9–93–027 for Japanese Patent Application No. Hei 05–181593.

*Primary Examiner*—Michael W. Phillips
*Attorney, Agent, or Firm*—Daniel E. McConnell; Anthony N. Magistrale

[57] ABSTRACT

Disclosed is a docking unit which includes a mechanical lock having an unlock position and a lock position. A security key is provided for manipulating the mechanical lock to move between the unlock position and the lock position. The security key is (1) detachable from the mechanical lock at the lock position and (2) undetachable from the mechanical lock at the unlock position. The docking unit further includes a latch for securing a portable computer to the unit in response to positioning of the mechanical lock in the lock position and releasing the computer from the unit in response to positioning of the mechanical lock in the unlock position. The unit also includes an inhibitor for selectively inhibiting the mechanical lock from movement to the lock position.

4 Claims, 13 Drawing Sheets

PORTABLE COMPUTER DOCKING UNIT HAVING AN INHIBITOR FOR INHIBITING MOVEMENT OF A MECHANICAL LOCK TO A LOCK POSITION

BACKGROUND OF THE INVENTION

The present invention relates to a docking unit that is to be coupled with a portable computer to expand the functions of the portable computer. More particularly, the present invention pertains to a docking unit for a portable computer with which, when employed by a plurality of users, absolute security can be maintained.

As a consequence of current developments in technology, various types of personal computers, such as desktop and notebook computers, have been developed and are available on the market. Of these computers, the notebook computers are battery-operable personal computers for which portability is a design consideration.

Since compact size and light weight are important notebook computer features, expanding these computers by adding peripheral devices internally is not practicable because no extra space is available, and device expansion that is accomplished by merely using a PC card can not sometimes provide a viable alternative. Furthermore, as the exterior dimensions of a notebook computer ensure but a small surface area, only a very limited number of bus slots can be provided. Thus, while it is not unusual for desktop computers to have ten or more bus slots, ordinarily no bus slots, or one or two at the most, are provided for laptop and notebook computers. And since portability is the most important feature for a notebook computer, having to attach or detach a cable (e.g., a printer cable, a monitor cable, a communication cable) each time the notebook computer is used, whether in or outside an office, is a very complicated task that adversely affects the usability of the unit.

The employment of a so-called "docking station" (also called an "expansion box" or an "expansion unit"), when a notebook computer is used in an office, makes it possible to provide with a notebook computer the same working environment as that provided with a desktop computer, while at the same time having no adverse affect on portability. The primary functions of a docking station are "port replication" and "bus expansion". Port replication function is realized by providing a docking station having connection ports for notebook computer expansion. In other words, when a cable has been connected to each port of a docking station in advance, a user need only dock a notebook computer in the docking station to immediately secure the use of a printer, an external monitor, and a network. From the point of view that all cable connections are managed by the docking station, the port replication function is also called a "cable management function". The bus expansion function is realized by a docking station possessing the capability to expand the bus in a notebook computer, and having at least one bus slot. By docking a notebook computer in a docking station, it is possible for a user to employ desired adaptor cards and devices via the docking station. In other words, no special limitations are placed on the user of a notebook computer.

Docking stations are disclosed in, for example, the specifications for Japanese Patent Application No. Hei 05-181593 (Internal docket No.: JA9-93-027), and in Japanese Patent Application No. Hei 06-134124 (Internal docket No.: JA9-94-030), both of which are owned in common with the present invention.

Figure 21:
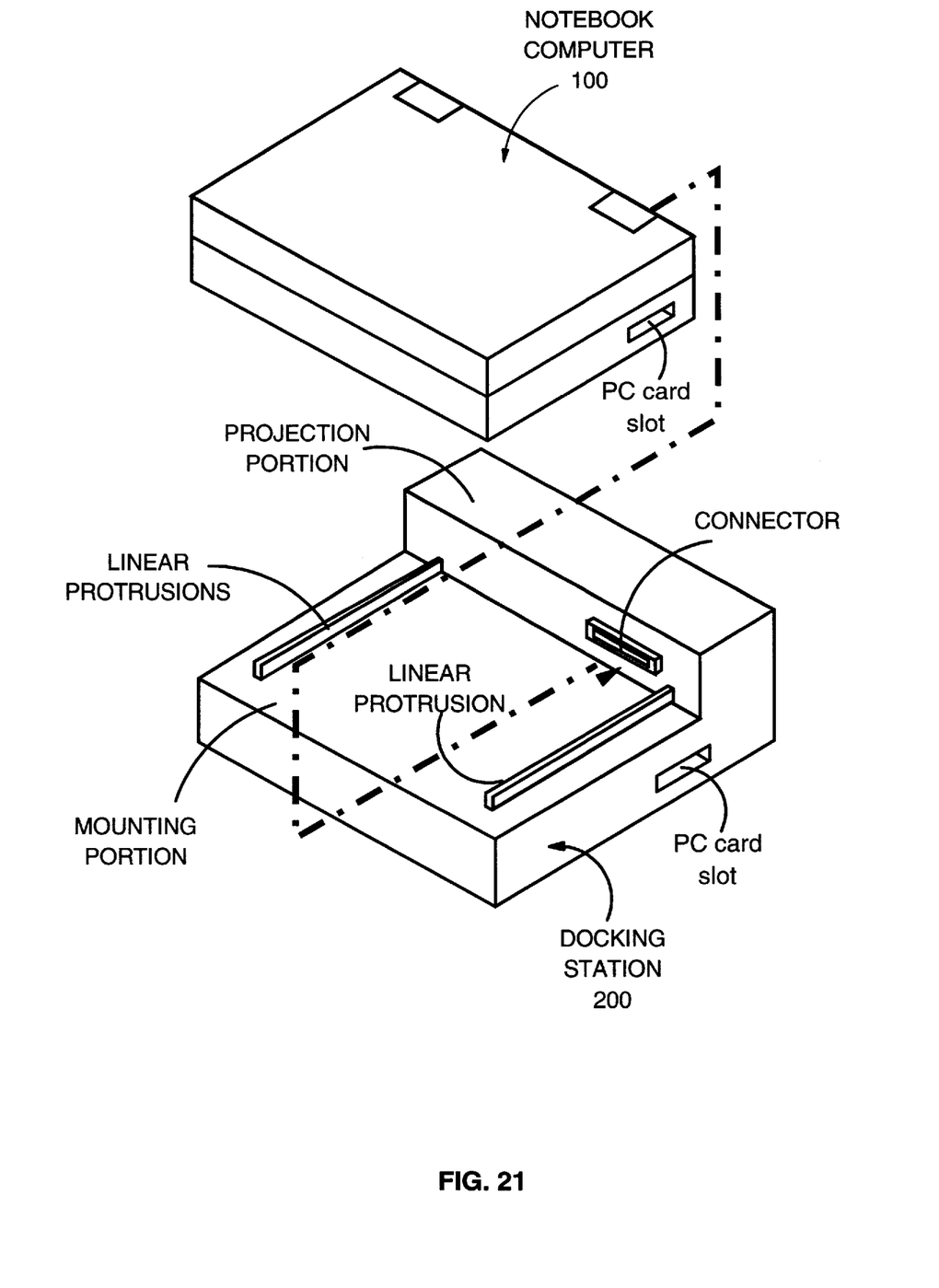
FIG. 21 is a diagram showing a typical design for a conventional docking station.

FIG. 21 of the accompanying drawings shows a typical notebook computer 100 and docking station 200. At the rear of the notebook computer 100, a connector (not shown, which is hereinafter referred to as a "docking connector") is provided. The docking connector generally includes several tens to several hundreds of connector pins, with each connector pin being assigned for a port signal line and a bus signal line in the notebook computer 100. The bus that the notebook computer 100 allocates for the docking connector (i.e., the bus for which expansion is desired) is ordinarily an ISA (Industry Standard Architecture) bus, which is an input and output bus. This is because the ISA bus has long been the popular standard in this field and there are thus legacy assets that can be inherited, such as ISA devices and ISA applications. In addition, among some of the latest notebook computers, instead of an ISA bus, a PCI (Peripheral Component Interconnect) bus, which is positioned as a local bus for a CPU, is assigned to a docking connector, i.e., the PCI bus is expanded. This seems to have occurred for the following reasons: the number of devices, such as graphics and PC cards, that require high speed data transfer has increased; expansion of the PCI bus is easy since a number of devices can be connected to a single PCI bus; and a bus can be electrically, stably expanded by means of a bridge circuit.

A PC card, that conforms to the preceding specifications, can be inserted into a PC card slot provided on the side of the notebook computer 100, or into a PC card slot provided on the side of the docking station 200. The insertion and removal of the PC card can be performed as desired.

The docking station 200 comprises a main body that incorporates electric circuitry; a mounting portion whereat the notebook computer 100 is mounted on the top of the main body; and a projection portion that projects upward from the rear end of the mounting portion. A connector is provided on the front face of the projection portion to engage a docking connector that is provided on the rear face of the notebook computer 100. The surface of the connector may be covered with a lid that is freely opened and closed in order to protect the connector when it is not in use. A pair of linear protrusions are so formed along both sides of the mounting portion that a notebook computer is guided along them as it is being mounted.

The configurations of docking stations vary, and they range from relatively small ones that have only a port replication function, to relatively large ones that can afford to provide a plurality of storage spaces (also called "media bays") in which fixed or detachable memory devices (HDDs, FDDs, CD-ROM drives, etc.) can be mounted, or that can accommodate a plurality of adaptor cards.

These docking stations are used in accordance with the users' needs, i.e., they are individually employed for the purpose of expanding the availability of peripheral devices for individual notebook computers, and are employed in common by a plurality of users for the purpose of expanding their notebook computers' peripheral environment.

For individual use (single user mode), the notebook computer of a user must be securely fixed to a docking station to protect it from theft. For this purpose, a key is used to secure the notebook computer in the docking station and to inhibit the extraction of PC cards. Then, the key is extracted and kept in a secure area so as to protect the notebook computer and the PC cards from theft.

When a docking station is to be employed by a plurality of users (multi-user mode), however, because each user must have a key, notebook computer protection that requires the use of a key is inconvenient, and the management procedures involved are complicated. When a docking station is used in common, the protection provided by using a key to secure a notebook computer in a docking station is not required, and once a user has completed an operation with a notebook computer docked in the docking station, the user can merely remove the notebook computer from the docking station. Nevertheless, as PC cards that are provided with a docking station are used in common, normally they should not be removed and must therefore be constantly protected from theft.

Conventional docking stations, however, do not completely provide the above described protection. In particular, there are no docking stations that afford the protection required for both the single user mode and the multi-user mode.

SUMMARY OF THE INVENTION

With the foregoing in mind, it is therefore one purpose of the present invention to provide an excellent docking unit that can be coupled with a portable computer, and that can protect the portable computer and its peripheral devices.

It is another purpose of the present invention to provide an excellent docking unit, that, in accordance with a mode selected by a user, can protect the portable computer and its peripheral devices.

BRIEF DESCRIPTION OF THE DRAWINGS

Some of the purposes of the invention having been stated, others will appear as the description proceeds, when taken in connection with the accompanying drawings, in which.

DESCRIPTION OF THE PREFERRED EMBODIMENTS(S)

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of the invention. Accordingly, the description which follows is to be understood as being a broad, teaching disclosure directed to persons of skill in the appropriate arts, and not as limiting upon the present invention.

Figure 1:
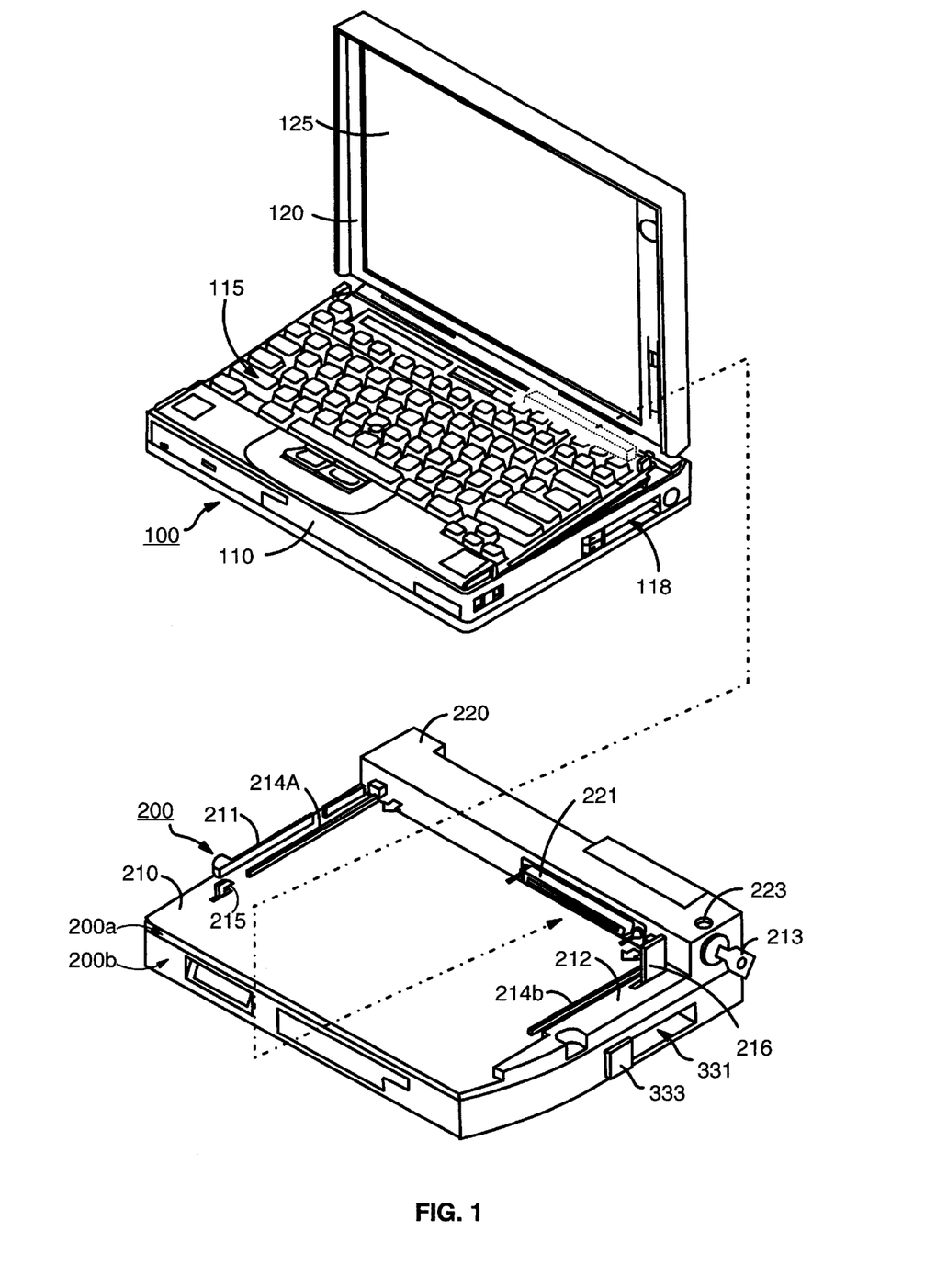
FIG. 1 is a perspective view of the exterior of a docking unit for a portable computer according to one embodiment of the present invention.

FIG. 1 is a diagram illustrating the external appearance of a docking unit 200 that embodies of the present invention. The docking unit 200 comprises two independent sections that can be physically coupled with and separated from each other: an upper section 200a and a lower section 200b. The upper section 200a of the docking unit 200 includes a security key 213, a first shutter 216, and a hook 215 that pertains to the subject matter of the present invention. The lower section 200b of the docking unit 200 includes a second shutter 333 that is also related to the subject matter of the present invention.

A notebook computer 100 is a personal computer comprising a shallow-bottom main body 110, and a lid 120 rotatably attached at the almost rear edge of the main body 110. The footprint of the notebook computer 100 is, for example, the size of a sheet of A4 paper. Generally, a keyboard unit 115 is mounted on top of the main body 110, and a liquid crystal display (LCD) 125 is fitted inside the inner face of the lid 120.

Especially with the notebook computer 100 that relates to the present invention, a docking connector (not shown) is formed on its rear face. Also, formed in the bottom face are a pair of linear grooves (not shown) into which a pair of linear protrusions (described later) are to be inserted into and along which they are guided, and an opening on the docking unit 200 side (not shown) for engaging the hook 215 (described later). Further, a card exchange port 118 is formed in the left side of the notebook computer 100, so that a PC card can be detached and exchanged.

One example of such a notebook computer 100 is the "IBM ThinkPad 760" ("ThinkPad" is a trademark of IBM Corp.) sold by IBM Japan, Ltd. It should be noted that the structure of the notebook computer is not the subject of the present invention.

The docking unit 200 comprises a mounting portion 210 on which the notebook computer 100 is mounted, and a projection portion 220 projected upward at the rear of the mounting portion 210.

The mounting portion 210 is a thin and rigid structure that has a width and a depth that correspond to the footprint of the notebook computer 100. A side wall 211 is defined at the left end of the mounting portion 210, while a security link cover 212 is provided on the right end. The security link cover 212 is a member that covers and hides a transmission mechanism (described later) that transmits the rotation of a security key 213 (i.e. key position) to the individual sections. The transmission mechanism is employed to set the docking unit 200 to a predetermined security mode (which will be described later). The rotation of the security key 213 is transmitted, for example, to the hook 215, which is located substantially at the front on the mounting portion 210; the first shutter 216, which is provided upright on the top of the security link cover 212; and the second shutter 333, which is provided perpendicularly on the right side of the docking unit 200 (described later).

A distance between the side wall 211 and the internal wall of the link cover 212 is formed about the same as the width of the notebook computer 100 in the direction of the depth. A pair of linear protrusions 214a and 214b protrude upward along the right and the left side of the top face of the mounting portion 210, and form a predetermined distance in the direction of the depth. When the notebook computer 100 is to be mounted on the docking unit 200 as indicated by the chained line in FIG. 1, the direction of movement of the notebook computer 100 is restricted by the side wall 211 and the inner wall of the link cover 212, and the notebook computer 100 is guided along the linear protrusions 214a and 214b so that it is readily attached.

A connector 221 is firmly fixed within the right front face of the projection portion 220 that is provided at the rear of the docking unit 200, and is employed for connection to the notebook computer 100. The electrical and mechanical specifications of the connector 221 match those of the docking connector of the notebook computer 100. The connector 221 consists, for example, of a terminal having 240 pins which includes various port signal pins and a bus signal pin.

Electrical circuits (not shown) are mounted inside the projection portion 220. The electrical circuit mainly plays the role of separating the signal pins of the connector 221 into the port signal pins and the bus signal pins. The signal pins are separated in such manner because the docking unit 200 has a portion that performs the port replication function and a portion that performs the bus expansion function.

Figure 2:
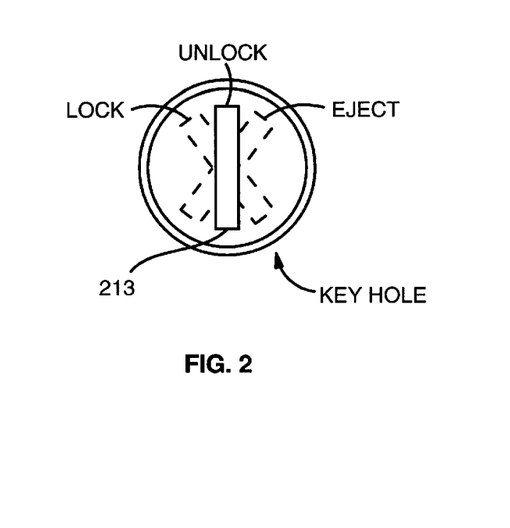
FIG. 2 is a diagram showing key positions for a security key 213.

There are three key positions for the security key 213 provided at the rear on the left side of the docking unit 200, as is shown in FIG. 2, reading from the right: the "eject position", the "unlocked position", and the "locked position". The individual key positions correspond to the operating conditions for the device. More specifically, the eject position is a key position at which the mounted notebook computer 100 is ejected; the unlocked position is a key position at which the notebook computer 100 is not locked in place so that it can be mounted, even though it can be mounted; and the locked position is a key position at which the removal of both the mounted notebook computer 100 and a loaded PC card is inhibited. The rotation of the security key 213 is transmitted to the individual sections of the docking unit 200 by the transmission mechanism in the link cover 212 (described later), so that these sections perform predetermined operations. An indicator 223 is provided on the top right end of the projection portion 220 to display a key position.

Figure 3:
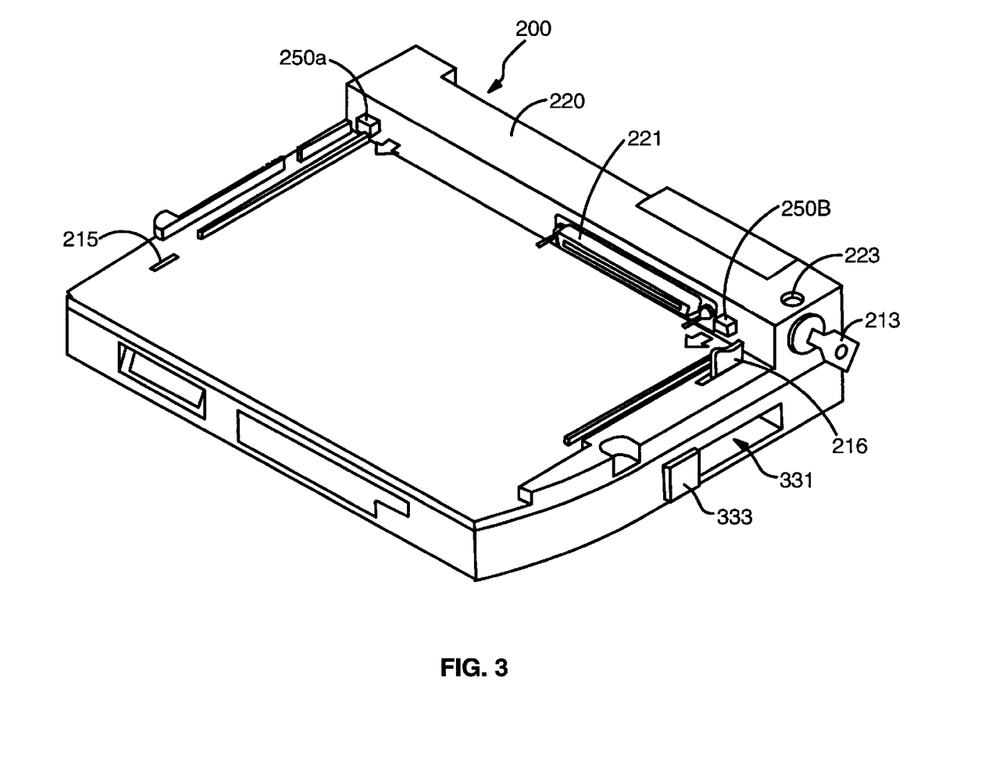
FIG. 3 is a diagram showing the state when the security key 213 is placed at the eject position.

FIG. 3 shows the status where the security key 213 is placed at the eject position. As the security key 213 is rotated clockwise from the unlocked position, a pair of ejectors 250a and 250b interact and project outward from the right and left front of the projection portion 220. The ejectors 250a and 250b abut against the mounted notebook computer 100 (not shown in FIG. 3) and drive it forward.

A resisting force for returning from the eject position to the unlocked position constantly acts on the security key 213. The function is provided based on the reasoning that the eject operation should be performed only temporarily, and that the security key 213 must normally be at the unlocked position at which a notebook computer 100 can be mounted. In addition, while taking into consideration that the key operation is required for conditions other than the locked condition, and that the removal of the key is not required, removal of the security key 213 from the key hole is prevented while it is at the eject position or at the unlocked position. Since the security key 213 is always inserted, a plurality of users can share a single docking unit (multi-user mode).

Figure 4:
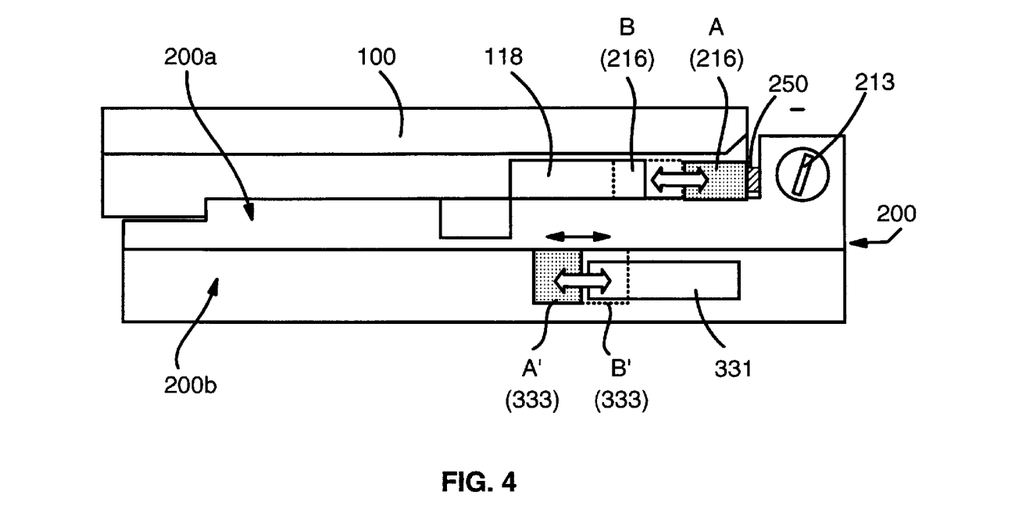
FIG. 4 is a diagram showing the state when the security key 213 is placed at the eject position in single user mode.

At this position, in the single user mode, while a PC card, etc., can be freely inserted into the PC card slot 331, no protection is provided that prevents the removal of the PC card (position A(333) in FIG. 4).

Figure 5:
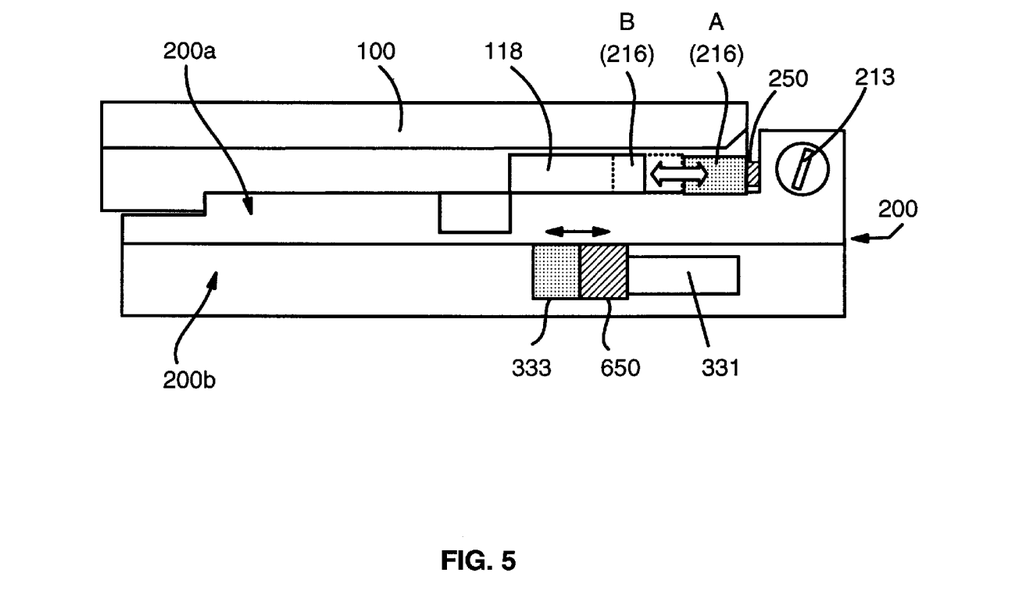
FIG. 5 is a diagram showing the state when the security key 213 is placed at the eject position in multi-user mode.

In the multi-user mode, however, neither PC card can be inserted into the PC card slot 331, nor the removal of a PC card is allowed (position 650 in FIG. 5).

The state where the security key 213 has been turned until it is almost vertical is the unlocked state. The unlocked state is a neutral state between the eject position and the locked position.

Figure 6:
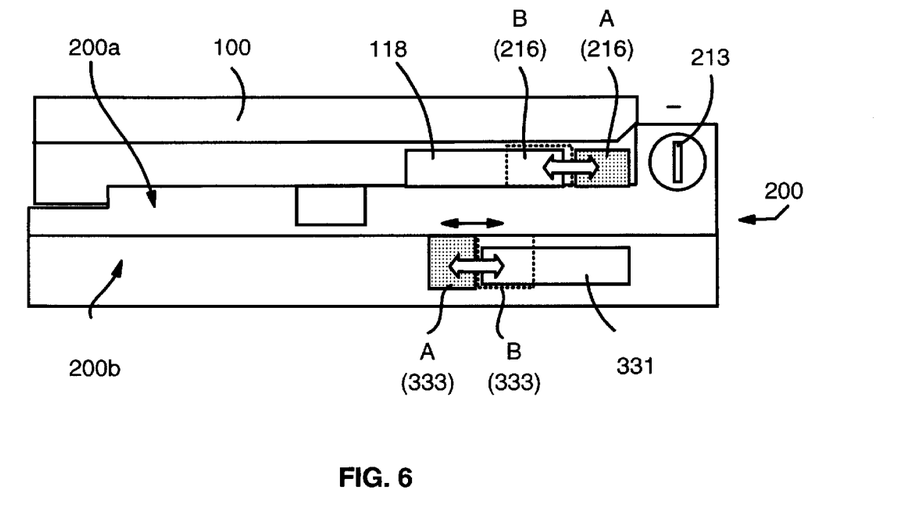
FIG. 6 is a diagram showing the state when the security key 213 is placed at the unlocked position in single user mode.

At this position, in the single user mode, while a PC card, etc., can be freely inserted into the PC card slots 118 and 331, no protection is provided that prevents the removal of the PC card (positions A(216) and A(333) in FIG. 6).

Figure 7:
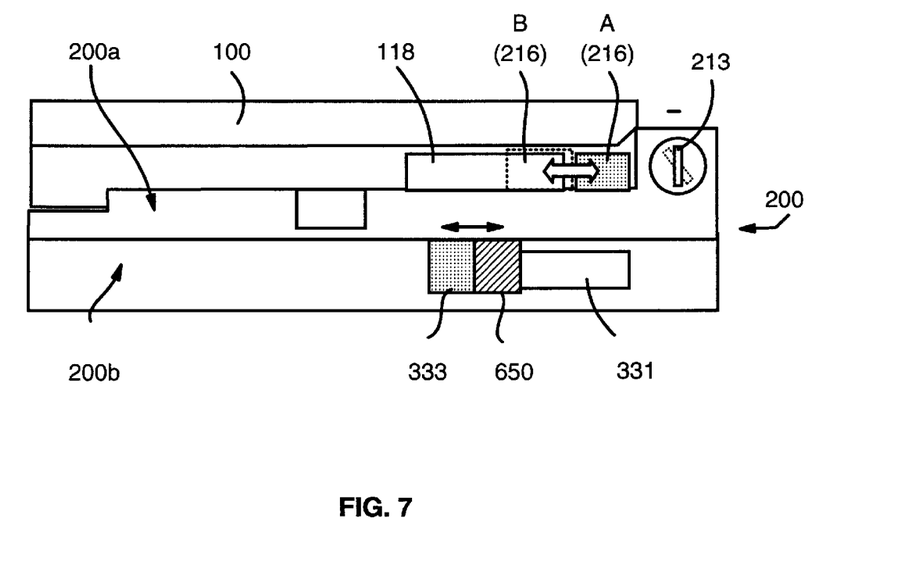
FIG. 7 is a diagram showing the state when the security key 213 is placed at the unlocked position in multi-user mode.

In the multi-user mode, however, although PC cards can be freely inserted into the PC card slot 118 of the notebook computer 100 and no protection is provided that prevents their removal from the slot 118 (position A(216) in FIG. 7), no PC card can be freely inserted into the PC card slot 331, and the removal from the slot 331 is inhibited (position 650 in FIG. 7).

In the single user mode, when the security key 213 is rotated counterclockwise further from the unlocked position to the locked position, the docking unit 200 is locked together.

Figure 8:
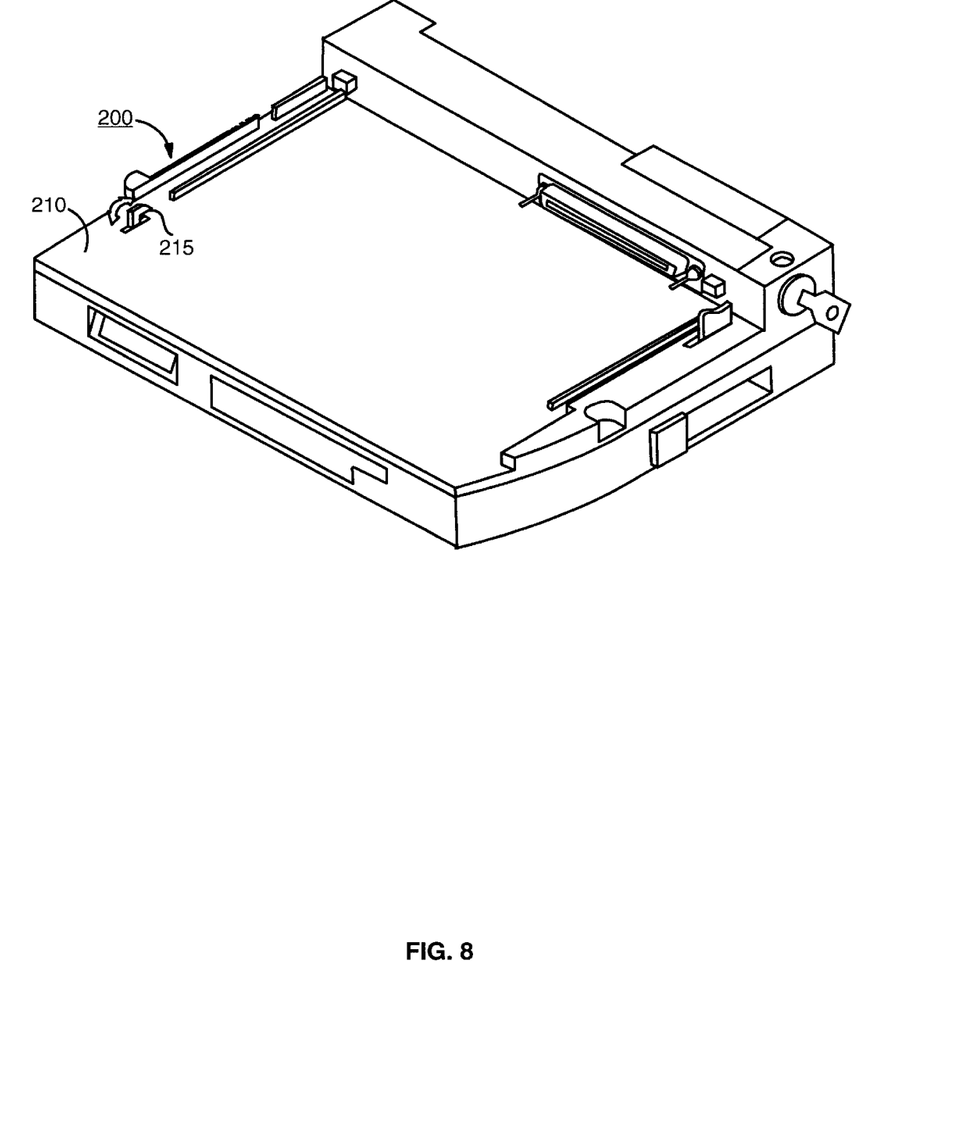
FIG. 8 is a diagram showing the state when the security key 213 is placed at the locked position in single user mode.
Figure 9:
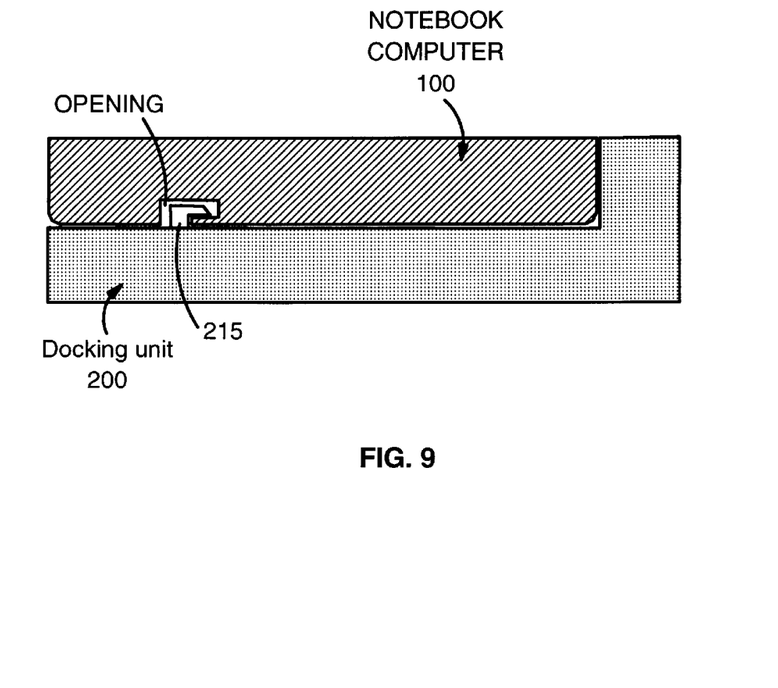
FIG. 9 is a diagram showing the state where a hook 215 engages a notebook computer 100.

One action that accompanies the shift to the locked position involves the employment of the hook 215 to inhibit the removal of the notebook computer 100. In the unlocked condition, the hook 215 is freely extracted from the notebook computer 100 and is retracted into the mounting portion 210 (see FIG. 8). However, when the security key 213 is turned to the locked position, the hook 215 interlocks with the notebook computer 100 and is fixed in the extended state, and the retraction of the hook 215 into the mounting portion 210 is inhibited. As a result, as is shown in FIG. 9, the hook 215 is maintained in a position where it engages the opening formed in the corresponding portion at the bottom of the notebook computer 100, and the removal of the notebook computer 100 is strictly inhibited.

Figure 10:
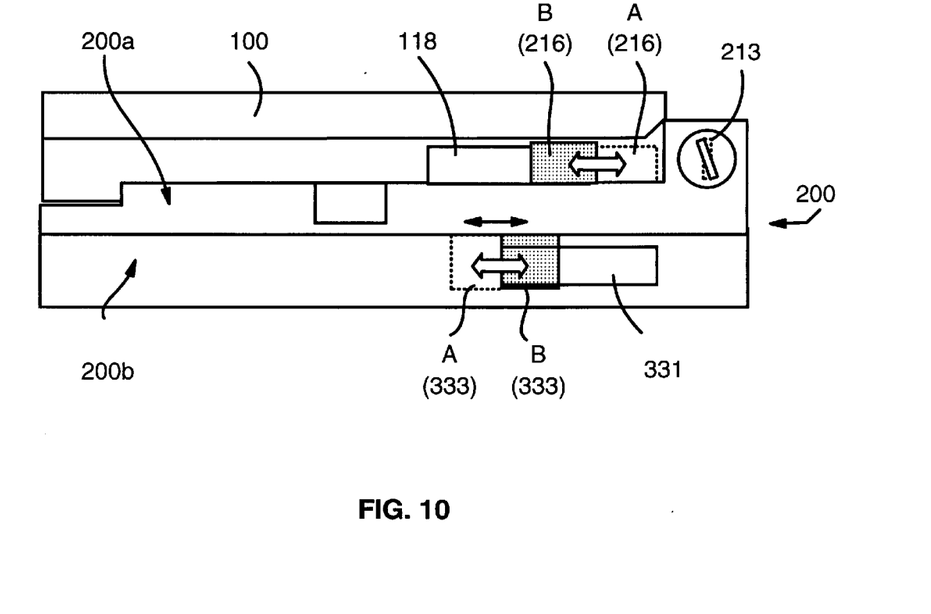
FIG. 10 is a diagram showing the state when the security key 213 is rotated from the unlocked position and placed at the locked position in single user mode.

Another action that accompanies the shift to the locked position is the inhibition of the removal of a PC card from the PC card slot 118 of the notebook computer 100. As was previously described, the card slot 118 is on the about rear left side of the notebook computer 100. The first shutter 216 is located upright on the top of the link cover 212 of the docking unit 200. As is shown in FIG. 10, the first shutter 216 interacts with the rotation of the security key 213 and slides forward and backward. At the unlocked position, the first shutter 216 is positioned at the rear (A) and the card slot 118 of the notebook computer 100 is fully opened. At the locked position, however, the first shutter 216 slides forward and shields at least one part of the card slot 118 (B). As a result, the removal of the PC card is desirably inhibited.

An additional action that accompanies the shift to the locked position is the inhibition of the removal of a PC card from the PC card slot 331 in the lower section 200b of the docking unit 200. As was previously described, the card slot 331 is at the about rear left side of the docking unit 200, and the second shutter 333 is vertically formed in the about center of the left side of the docking unit 200. As is shown in FIG. 10, the second shutter 333 interacts with the rotation of the security key 213, and slides forward and backward. At the unlocked position, the second shutter 333 is positioned almost in the center (A) and the card slot 331 of the docking unit 200 is fully opened (see FIG. 6). At the locked position, however, the second shutter 333 slides backward and shields at least one part of the card slot 331 (B). As a result, the removal of a PC card is preferably inhibited.

A further action that accompanies the shift to the locked position is the inhibition of the separation of the upper section 200a of the docking unit 200 and the lower section 200b of the docking unit 200. Since the separation of these sections is inhibited, peripheral devices (e.g., an HDD, a CD-ROM, and an FDD that are retained in a media bay) in the docking unit 200 can be protected from being accidentally removed.

Unlike at the other key positions, the removal of the security key 213 is permitted at the locked position. This prevents an unauthorized user from operating the key, and provides physical security.

Figure 11:
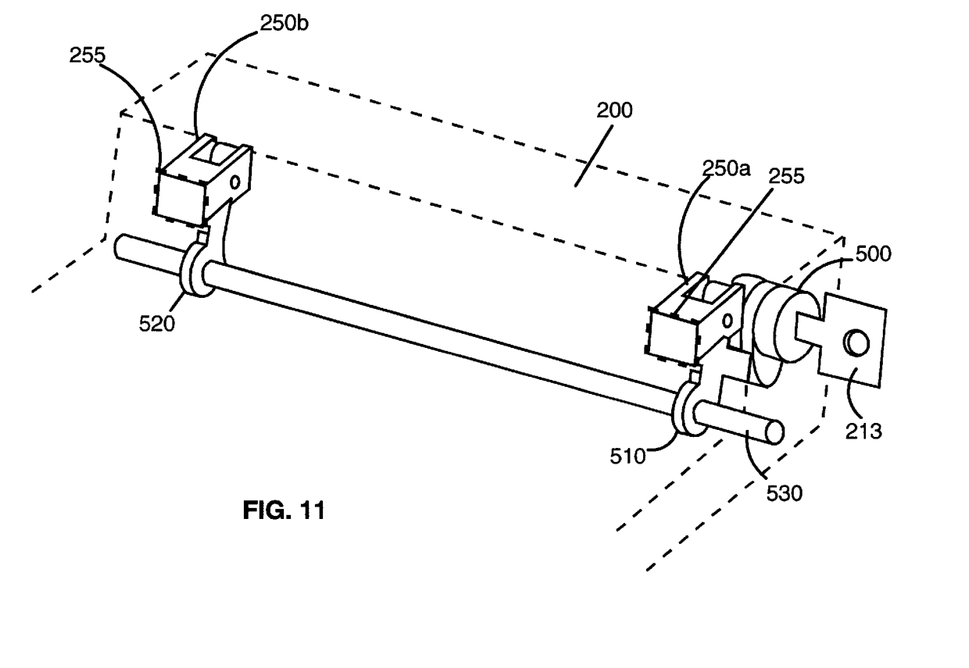
FIG. 11 is a diagram showing an ejection mechanism at the unlocked position.
Figure 12:
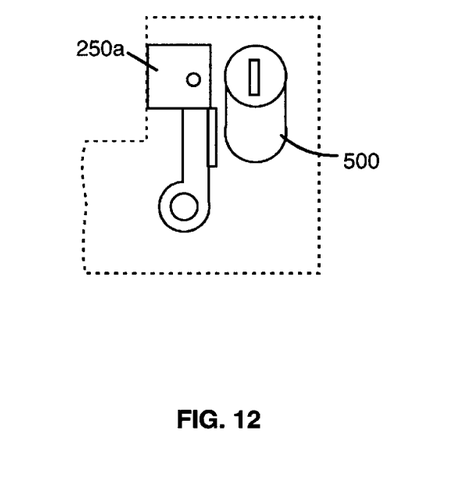
FIG. 12 is a diagram showing the ejection mechanism at the unlocked position.
Figure 13:
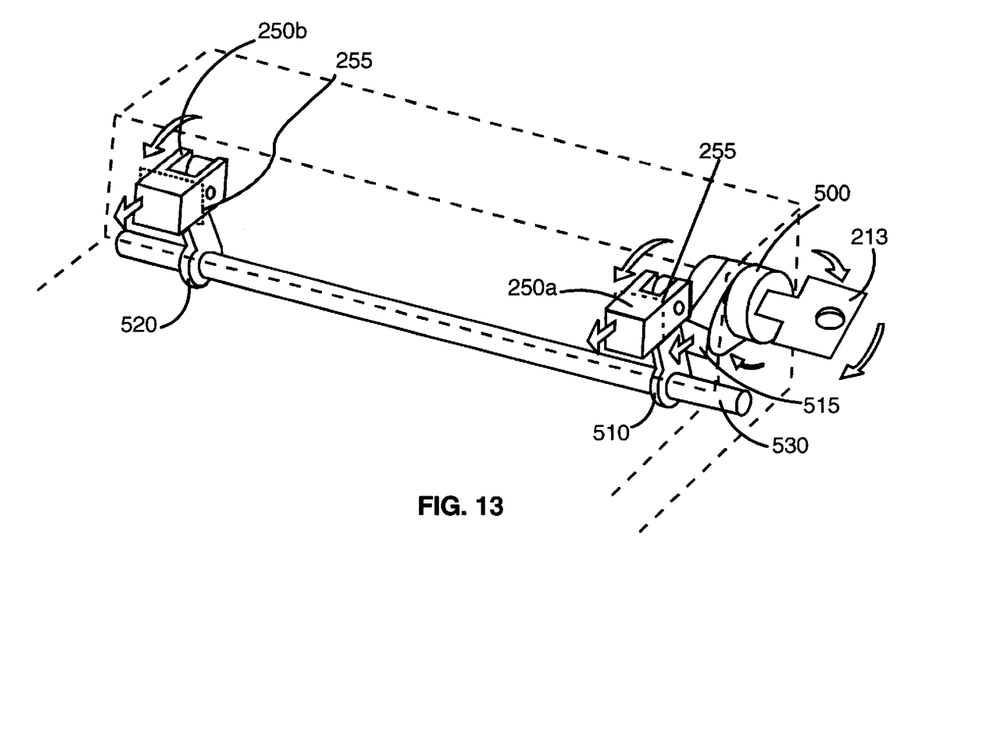
FIG. 13 is a diagram showing the ejection mechanism at the eject position.
Figure 14:
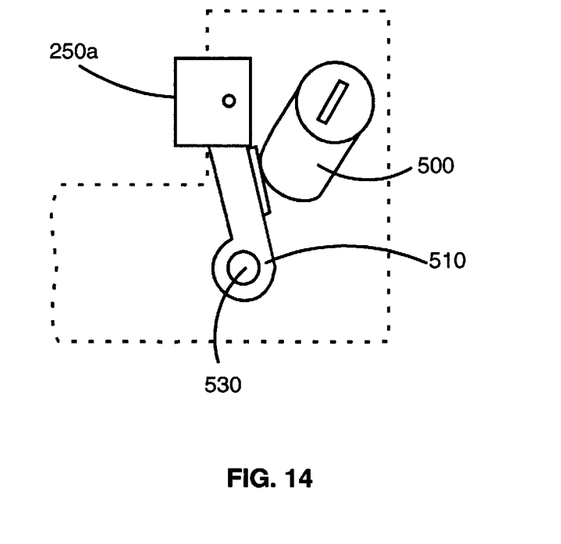
FIG. 14 is a diagram showing the ejection mechanism at the eject position.

The structure of the ejectors 250a and 250b (hereafter referred to, as a pair, as the ejectors 250) at the eject position will now be explained while referring to schematic diagrams in FIGS. 11 through 14. In FIGS. 11 and 12 are shown the ejectors 250 when they are at the unlocked position. The external frame of the docking unit 200 is delineated by broken lines so that it can be understood that the interior of the docking unit 200 is depicted. At the eject position, the ejectors 250 are stored inside the docking unit 200. This state is the same as when the security key 213 is situated at the locked position. In FIGS. 13 and 14, when the security key 213 is rotated to the eject position, a cam 500 pushes forward a protrusion 515 of a coupling member 510 that is connected to the ejector 250a. The coupling member 510 rotates around a coupling rod 530, which serves as a rotary shaft. With the movement of the coupling member 510, a portion of the ejector 250a is extended outward from the docking unit 200, through an ejector port 255, and pushes against the left rear portion of the notebook computer 100 (not shown). The rotation of the coupling member 510 is transmitted to the coupling rod 530, and a coupling member 520 that is fitted over the coupling rod 530 is rotated in the same direction. At the same time the ejector 250a is extended, therefore, a portion of the ejector 250b is also extended outward from the docking unit 200, through an ejector port 255, and pushes against the right rear end of the notebook computer 100 (not shown).

Figure 15:
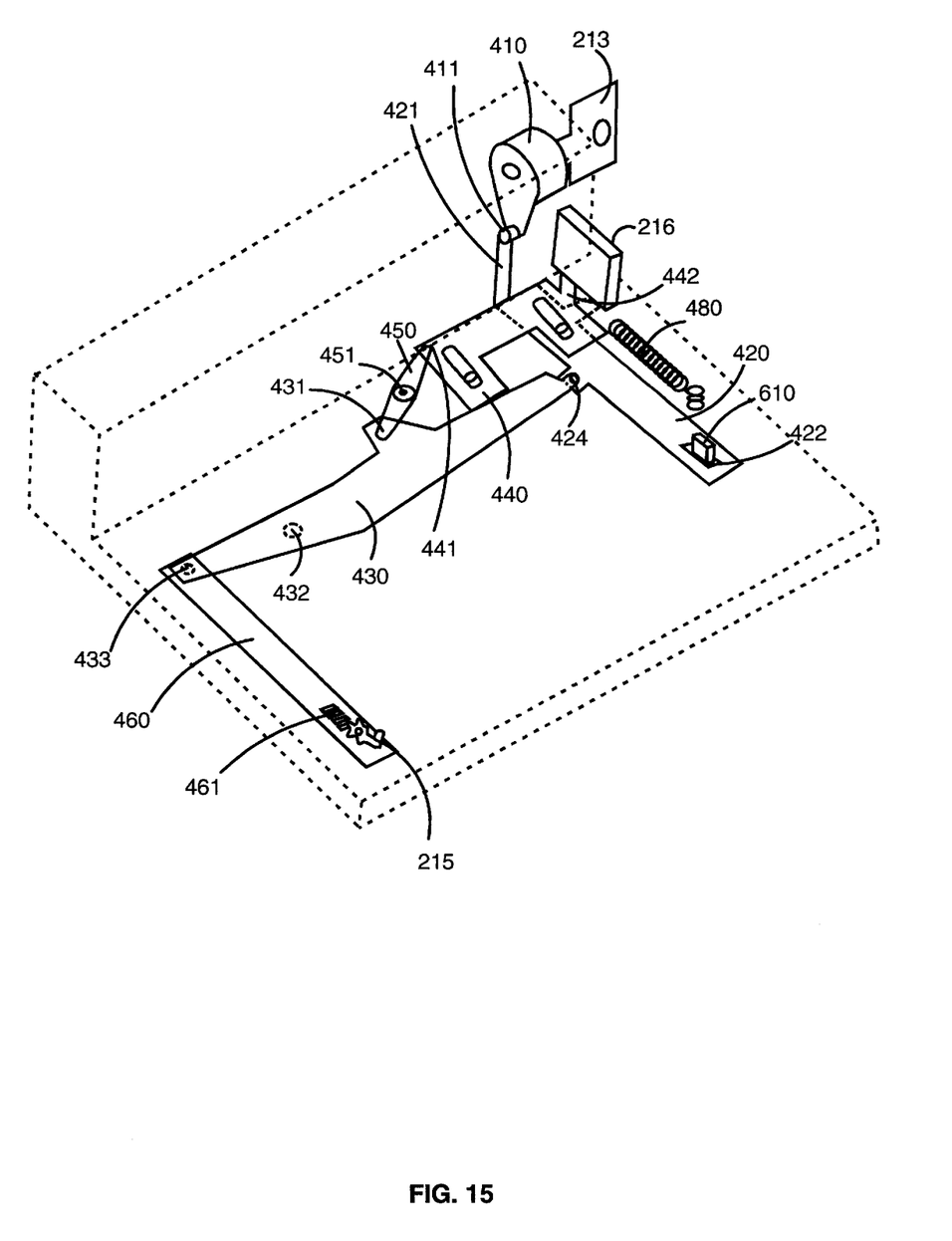
FIG. 15 is a diagram showing the internal structure of the upper section of the docking unit at the unlocked position.

The functioning of the internal mechanism when the key is turned from the unlocked position to the locked position will now be explained. In FIG. 15 is shown the internal structure of the upper section 200a of the docking unit 200 when the security key 213 is situated at the unlocked position.

The internal mechanism comprises: a cam 410 that interacts with the security key 213; a slide plate 420 that contacts a protrusion 411 of the cam 410; a rotary plate 430 which is coupled with the slide plate 420 and 460; the slide plate 460 and which is coupled with the rotary plate 430 at one edge portion and upon which a groove 461 is formed at the other edge portion; the hook 215 which has a gear for engaging the groove 461 in the slide plate 460; a coupling plate 450 which has one end coupled with the rotary plate; an inverted-U shaped slide plate 440, which is coupled with the other end of the coupling plate 450; and the first shutter 216 for contacting, upright, a slide base 442 of the inverted-U shaped slide plate 440.

Figure 16:
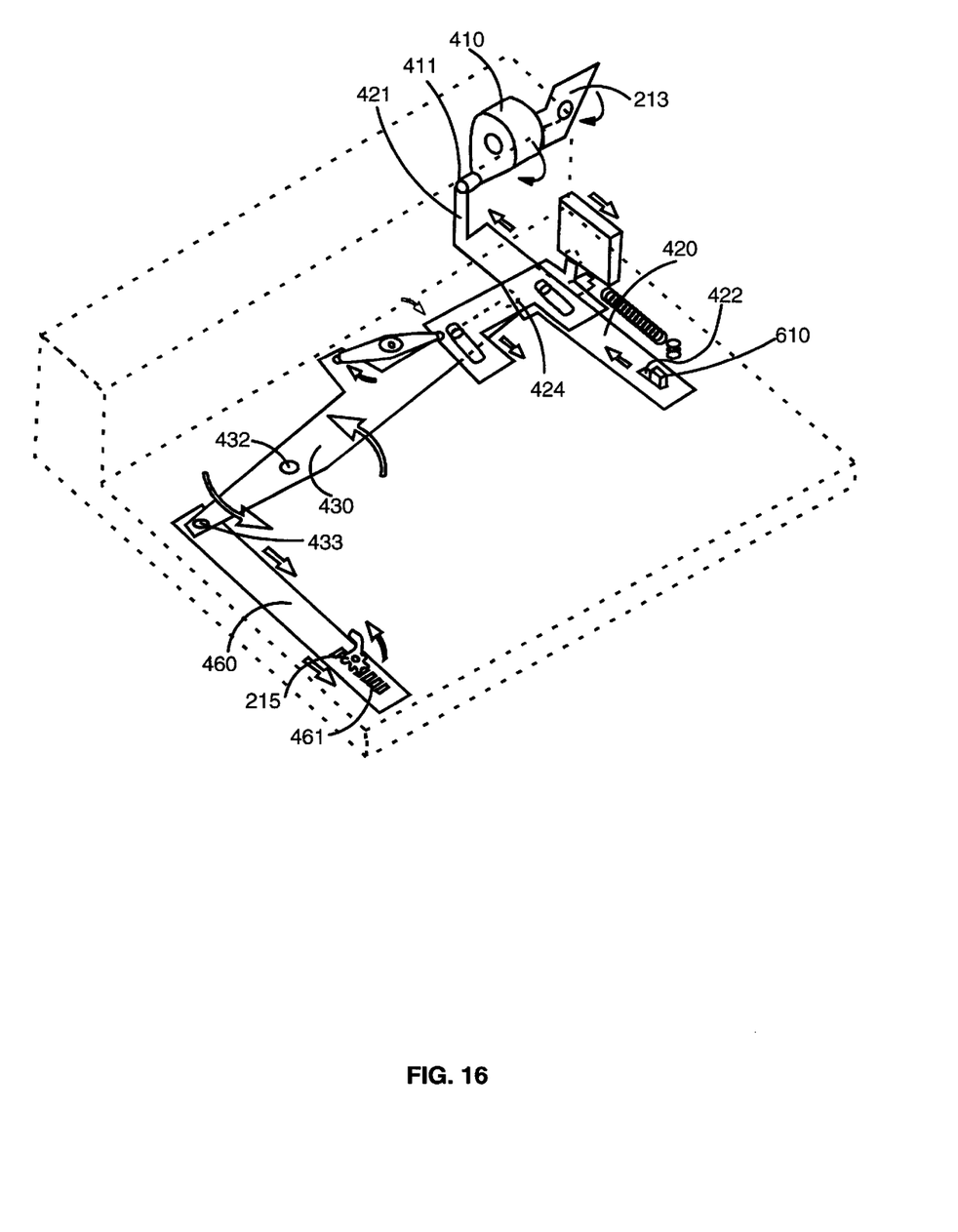
FIG. 16 is a diagram showing the internal structure of the upper section of the docking unit at the locked position.
Figure 17:
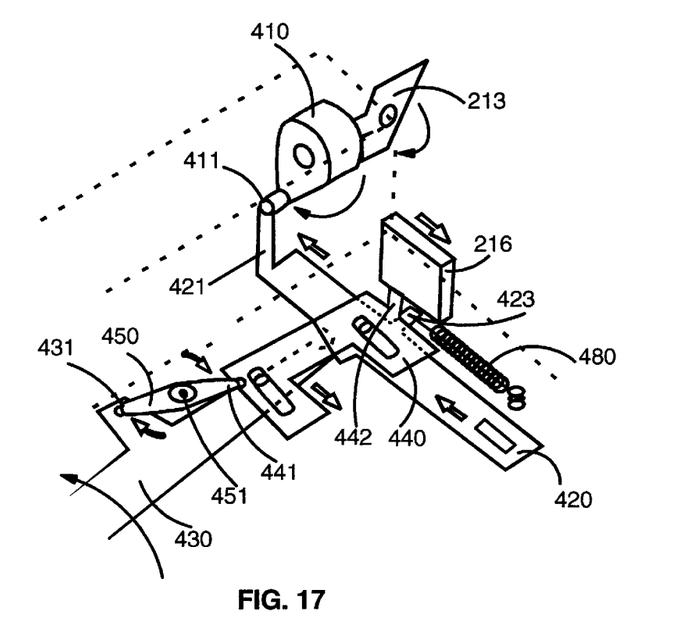
FIG. 17 is a diagram showing the internal structure of the first shutter of the upper section of the docking unit at the unlocked position.

In FIG. 16 are shown the movements of the individual components of the internal mechanism when the security key 213 is rotated to the locked position.

First, the locking mechanism for the notebook computer 100 (not shown) will be explained. When the security key 213 is rotated to the locked position, a vertical portion 421 of the slide plate 420 is pushed backward by the protrusion 411 of the cam 410, and the slide plate 420 slides to the rear. Thus, a contact point 424 at one end of the rotary plate 430 is pulled upward, and accordingly, the rotation plate 430 is rotated counterclockwise around a rotary shaft 432. The other end 433 of the rotary plate 430 is pushed downward, and the slide plate 460 that is connected to the end 433 of the rotary plate 430 slides forward. As the slide plate 460 slides forward, the hook 215 is raised by the grooves 461 and engages the notebook computer 100, which is then secured (see FIG. 9).

The sliding of the first shutter 216 will now be described. When the security key 213 is turned and situated at the locked position, the rotary plate 430 is rotated counterclockwise, as is described above. Then, a contact point 431 of the rotary plate 430 and the coupling plate 450 is pushed upward. The coupling plate 450 is rotated clockwise around a shaft 451, and a contact point 441, at the other end of the coupling plate 450, and the inverted-U shaped slide plate 440 is pushed downward. The inverted-U shaped plate 440 slides forward by the downward movement and the recovery force of the spring 480, which is connected to the plate 440, and the first shutter 216 fitted over the slide base 442 slides in the same direction. Therefore, one part of the PC card slot provided on in the right side of the notebook computer 100 is shielded, and the PC card that is inserted into the notebook computer 100 can be protected (see FIG. 10). The first shutter 216 can be replaced with one that is so shaped that it corresponds to the position of the PC card slot 118 of the notebook computer 100.

Figure 18:
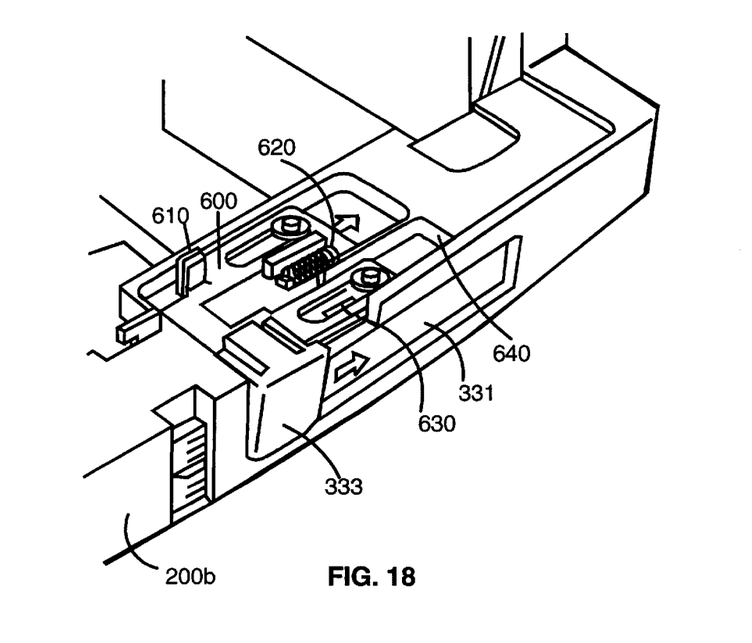
FIG. 18 is a diagram showing the internal structure of the second shutter of the lower section of the docking unit.

The sliding of the second shutter 333 of the lower section 200b of the docking unit 200 will be explained. The docking unit 200 can be separated into the upper section 200a and the lower section 200b. The structure of the second shutter 333 in the lower section 200b of the docking unit 200 is shown in FIG. 18. A lower slide 600 is coupled with the lower section 200b by a spring 620. The lower slide 600 reciprocates inside a slide frame 640. The second shutter 333 is fixed to and slides together with the lower slide 600. A protrusion 610 of the lower slide 600 extends into the upper section 200a of the docking unit 200 (see FIG. 16). When in FIG. 16 the security key 213 is turned and is situated at the locked position, the slide plate 420 slides backwards in the previously described manner. The protrusion 610 of the lower slide 600 that extends through an opening 422 in the slide plate 420 is also moved backward together with the slide plate 420. Thus, in FIG. 18, the lower slide 600 is moved in the direction indicated by A, and the second shutter 333 is also shifted in the same direction, and shields one part of the PC card slot 331. As a result, the PC card that is inserted inside the lower section 200b of the docking unit 200 can be protected (see FIG. 10).

Figure 19:
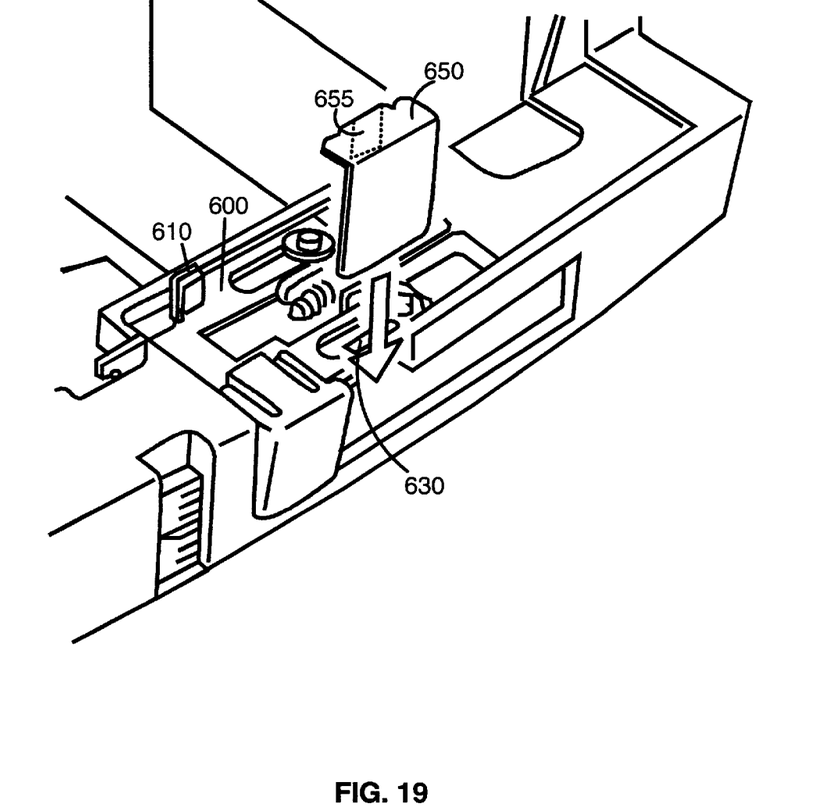
FIG. 19 is a diagram showing the state when the single user mode is changed to the multi-user mode.

Finally, the protection of a PC card, which is inserted into the lower section 200b of the docking unit, and the inhibition of the locked position in the multi-user mode will be described. An opening 630 is formed in the slide frame 640 of the lower section 200b of the docking unit 200. This opening 630 is located at a fixed position inside the lower section 200b (see FIG. 18). As is shown in FIG. 19, an L-shaped plug 650 is so attached that a protrusion 655 of the plug 650 is inserted into and fitted in the opening 630. Thus, the lower slide 600 cannot slide and the protrusion 610 of the lower slide 600 is also fixed. Therefore, in FIG. 15, the slide plate 420 is halted by securing the protrusion 610, and the rotation of the security key 213 to the locked position is inhibited.

Figure 20:
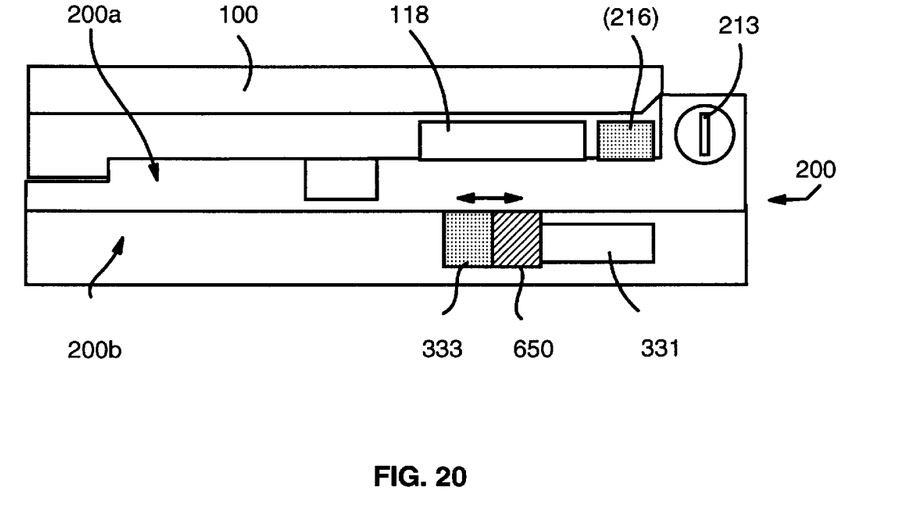
FIG. 20 is a diagram showing the state when the security key 213 is situated at the unlocked position in multi-user mode.

When the L-shaped plug 650 is attached and the upper section 200a and the lower section 200b of the docking unit 200 are assembled to form the docking unit 200, the removal of the L-shaped plug 650 is inhibited and the PC card slot 331 is partially shielded, so that the PC card inserted inside the lower section 200b can be protected (see FIG. 20).

In the drawings and specifications there has been set forth a preferred embodiment of the invention and, although specific terms are used, the description thus given uses terminology in a generic and descriptive sense only and not for purposes of limitation.

What is claimed is:

1. A docking unit for a portable computer comprising:

a mechanical lock having an unlock position and a lock position;

a security key for manipulating said mechanical lock to move between said unlock position and said lock position;

said security key being (1) detachable from said mechanical lock at said lock position and (2) undetachable from said mechanical lock at said unlock position;

a latch securing said portable computer to said unit in response to positioning of said mechanical lock in said lock position and releasing the computer from said unit in response to positioning of said mechanical lock in said unlock position; and an inhibitor selectively inhibiting said mechanical lock from movement to said lock position.

2. The docking unit of claim 1, wherein said unit accommodates mounting of a peripheral device and further wherein said inhibitor inhibits removal of a mounted peripheral device from said unit.

3. In combination, a portable computer and a docking unit for supporting said portable computer comprising:

a mechanical lock having an unlock position and a lock position;

a security key for manipulating said mechanical lock to move between said unlock position and said lock position;

said security key being (1) detachable from said mechanical lock at said lock position and (2) undetachable from said mechanical lock at said unlock position;

a latch securing said portable computer to said unit in response to positioning of said mechanical lock in said lock position and releasing the computer from said unit in response to positioning of said mechanical lock in said unlock position;

an inhibitor selectively inhibiting said mechanical lock from movement to said lock position; and wherein the portable computer accommodates mounting of a peripheral device and said latch secures a mounted peripheral device in the computer in response to positioning of said mechanical lock in said lock position.

4. The combination of claim 3, wherein said unit accommodates mounting of a peripheral device and further wherein said inhibitor inhibits removal of a mounted peripheral device from said unit.

* * * * *